United States Patent
Kaneko et al.

(10) Patent No.: US 6,879,396 B2
(45) Date of Patent: Apr. 12, 2005

(54) MONOCHROMATOR AND OPTICAL SPECTRUM ANALYZER USING THE SAME

(75) Inventors: Tsutomu Kaneko, Tokyo (JP); Toshikazu Yamamoto, Tokyo (JP); Tohru Mori, Tokyo (JP)

(73) Assignee: Ando Electric Co., Ltd., Tokyo (JP)

(*) Notice: Subject to any disclaimer, the term of this patent is extended or adjusted under 35 U.S.C. 154(b) by 181 days.

(21) Appl. No.: 10/285,191

(22) Filed: Oct. 31, 2002

(65) Prior Publication Data

US 2003/0081208 A1 May 1, 2003

(30) Foreign Application Priority Data

Oct. 31, 2001 (JP) .................................. P.2001-335385

(51) Int. Cl.⁷ .................................................. G01J 3/18
(52) U.S. Cl. ...................................... 356/334; 356/331
(58) Field of Search ................................ 356/334, 331, 356/332, 333, 326, 328, 305

(56) References Cited

U.S. PATENT DOCUMENTS

| | | | |
|---|---|---|---|
| 2,922,331 A | | 1/1960 | Fastie et al. |
| 4,973,159 A | * | 11/1990 | Sohma et al. ............... 356/328 |
| 5,233,405 A | * | 8/1993 | Wildnauer et al. .......... 356/333 |
| 6,411,382 B1 | * | 6/2002 | Nishina ....................... 356/333 |
| 6,549,281 B2 | * | 4/2003 | Tokumoto .................... 356/331 |
| 6,646,739 B2 | * | 11/2003 | Kaneko ....................... 356/334 |
| 2002/0021493 A1 | | 2/2002 | Kaneko |

FOREIGN PATENT DOCUMENTS

| | | |
|---|---|---|
| DE | 19845701 | 4/2000 |
| DE | 10020423 | 7/2001 |
| JP | 08-145795 | 6/1996 |
| JP | 2000-088647 | 3/2000 |
| JP | 2001-183233 | 7/2001 |
| JP | 2001-304963 | 10/2001 |

* cited by examiner

*Primary Examiner*—Layla Launchman
(74) *Attorney, Agent, or Firm*—Fish & Richardson P.C.

(57) ABSTRACT

A monochromator including: a concave mirror which converts incident light into parallel light and emits the parallel light, a plane diffraction grating for diffracting the parallel light emitted from the concave mirror, first reflection means which reflects first light diffracted by the plane diffraction grating and causes the diffracted light to enter the plane diffraction grating as second incident light, second reflection means which reflects second diffracted light and causes the reflected light to enter the plane diffraction grating as third incident light, and an exit slit disposed in the vicinity of a focal point such that third diffracted light is reflected by the first reflection means, to thereby enter the plane diffraction grating as fourth incident light and such that fourth diffracted light is converged at the focal point by the concave mirror, to thereby enable extraction of light having a specific wavelength.

14 Claims, 6 Drawing Sheets

MONOCHROMATOR AND OPTICAL SPECTRUM ANALYZER USING THE SAME

BACKGROUND OF THE INVENTION

1. Field of the Invention

The invention relates to a monochromator and an optical spectrum analyzer using the same.

2. Background Art

A known multipass monochromator causes light under measurement (hereinafter abbreviated as "LUM") to pass through a diffraction grating two or more times for achieving high resolution or a wide close-in dynamic range in relation to a spectral characteristic.

Such a multipass monochromator includes a double pass monochromator as described in, e.g., Japanese Patent Application Laid-Open No. 088647/2000, (a monochromator in which LUM passes through a diffraction grating twice). In order to improve the resolution of such a double pass monochromator, the number of times LUM passes through a diffraction grating must be increased by use of an additive dispersion arrangement which would increase the amount of dispersion.

Figure 6:
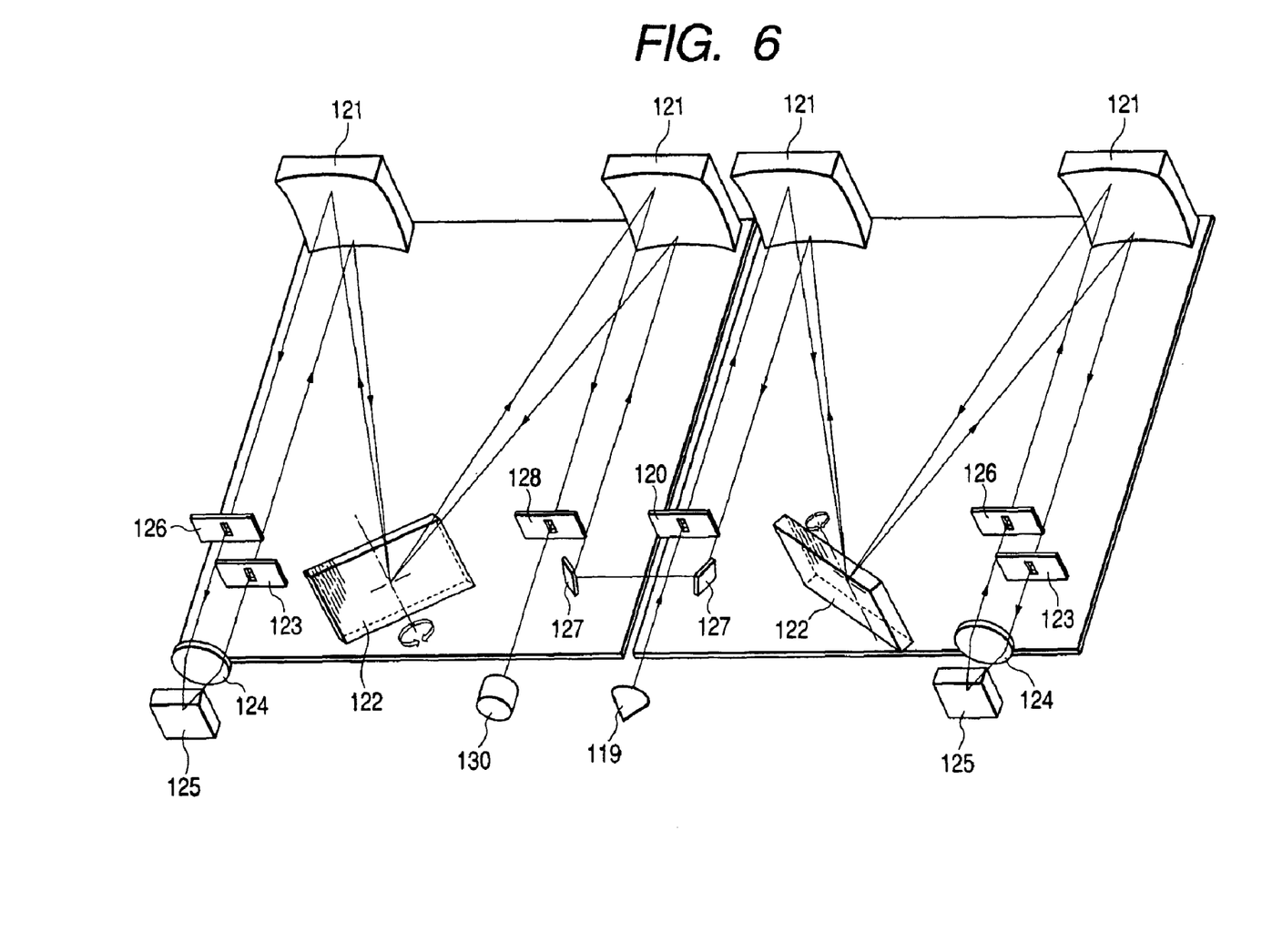
FIG. 6 is a view showing an example four-pass monochromator using two conventional double pass monochromators.

For instance, in order to cause LUM to pass through a diffraction grating four times, there is conceived an arrangement in which two double pass monochromators, each being described in Japanese Patent Application Laid-Open No. 088647/2000, are connected together so as to realize additive dispersion arrangement. FIG. 6 shows an exemplary arrangement (i.e., a four-pass monochromator).

As shown in FIG. 6, a conventional double pass monochromator comprises a light source 119 (for light under measurement: LUM); an entrance slit 120; an exit slit 128; intermediate slits 123, 126; a concave mirror 121; a diffraction grating 122; return reflection means 124, 125; and an optical receiver 130 for receiving an optical output.

The entrance slit 120 is interposed between the light source 119 and the concave mirror 121, thereby serving as an input slit. The exit slit 128 is interposed between the concave mirror 121 and the light receiver 130, thereby selecting a specific wavelength from second outgoing light and a resolving wavelength of the double pass monochromator. The intermediate slits 123, 126 are interposed between the concave mirror 121 and the return reflection means 124, 125, thereby selecting a diffraction wavelength for second diffraction.

In an example shown in FIG. 6, two double pass monochromators are arranged. Plane mirrors 127 are interposed between the monochromators such that the exit slit 128 of a preceding double pass monochromator serves as an entrance slit of a subsequent double pass monochromator, thus constituting a four-pass monochromator.

However, the four-pass monochromator such as that shown in FIG. 6 has a problem of a large number of optical components and upsizing of a monochromator.

A plurality of diffraction gratings are used for determining a wavelength of light passing through the slit, and hence control of the diffraction gratings becomes complicated. When an eight-pass monochromator which causes light to pass through diffraction gratings eight times is constituted by combination of the four-pass monochromators, the foregoing problems become more noticeable.

An example of four-pass monochromator is described as another conventional example in Japanese Patent Application Laid-Open Nos. 145795/1996 and 183233/2001. The monochromator described in Japanese Patent Application Laid-Open No. 145795/1996 is larger than that of the invention in terms of the number of components to be placed in the vicinity of the focal point of the concave mirror, thus posing difficult in arrangement of the components. Further, an example monochromator described in Japanese Patent Application Laid-Open No. 183233/2001 requires a large number of optical components.

When an eight-pass monochromator is constituted of the foregoing four-pass monochromators, connection of the monochromators raises a problem of an increase in the number of optical components, upsizing of a monochromator, and complication of control, as in the case of the example shown in FIG. 6.

Depending on the ambient temperature, the spectral characteristic of a conventional monochromator is susceptible to change. Even in the case of a high-resolution monochromator, if a temperature range in which the spectral characteristic can be ensured is narrow, control of ambient temperature is required, thereby rendering the monochromator bulky and a control operation complicated. One of the primary factors responsible for the problem is a positional relationship between a concave mirror constituting a monochromator and entrance and exit slits placed in the vicinities of a focal point of the concave mirror. The amount of change in the position of a focal point of the concave mirror caused by a change in ambient temperature differs from the amount of change in the positions of slits caused by a change in the distance between bases on which the slits are mounted. Hence, conversion of LUM into parallel light and selection of a specific wavelength at the exit slit are not performed in an ideal state. Therefore, the smaller the number of times LUM passes through the concave mirror in the monochromator, the less the LUM is influenced by a change in ambient temperature.

In the case of a four-pass monochromator such as that shown in FIG. 6, the LUM passes through the concave mirror eight times and is susceptible to change in the spectral characteristic attributable to a change in ambient temperature. Further, even in the case of another conventional four-pass monochromator, the LUM passes through the concave mirror as many as four times.

Conventional countermeasures for suppressing change in the spectral characteristics attributable to a change in ambient temperature are to move the slits in the event of change having arisen in ambient temperature or to attach a reinforcement member to the back of the concave mirror. Either countermeasure entails an increase in the number of components.

SUMMARY OF THE INVENTION

The invention has been conceived to solve the drawback set forth and aim at providing a monochromator which attains a high-resolution, wide close-in dynamic range by use of a smaller number of components and which can be made compact. Further, the invention aims at providing an optical spectrum analyzer which enables attainment of a wide temperature range within a high-resolution, wide close-in dynamic range through use of the monochromator and which is made compact.

A monochromator of this invention includes: a concave mirror which converts incident light into parallel light and emits the parallel light; a plane diffraction grating for diffracting the parallel light emitted from the concave mirror; first reflection means which reflects first light diffracted by the plane diffraction grating and causes the diffracted light to enter the plane diffraction grating as second incident light; second reflection means which reflects second diffracted light and causes the reflected light to enter the plane diffraction grating as third incident light; and an exit slit disposed in the vicinity of a focal point such that third diffracted light is reflected by the first reflection means, to thereby enter the plane diffraction grating as fourth incident light and such that fourth diffracted light is converged at the focal point by the concave mirror, to thereby enable extraction of light having a specific wavelength.

The foregoing arrangement is an additive dispersion arrangement in which light is subjected to four diffraction operations. Light rays are dispersed in the same direction, so long as the rays have the same wavelength. The greater the number of times light that is subjected to diffraction, the greater the increase in the amount of dispersion for a certain wavelength. As a result, the range of specific wavelength component to be selected by the exit slit becomes narrow, thereby realizing a high-resolution monochromator and achieving the object.

By means of the foregoing arrangement, LUM passes through the concave mirror as few as two times by the exit slit for selecting a wavelength. Hence, a high-resolution, wide close-in dynamic range can be obtained within a wide temperature range.

A monochromator of another aspect of the invention includes: a concave mirror which converts incident light into parallel light and emits the parallel light; a plane diffraction grating for diffracting the parallel light emitted from the concave mirror; first reflection means which reflects first light diffracted by the plane diffraction grating and causes the diffracted light to enter the plane diffraction grating as second incident light; second reflection means which reflects second diffracted light and causes the reflected light to enter the plane diffraction grating as third incident light; third reflection means disposed in the vicinity of a focal point such that third diffracted light is reflected by the first reflection means, to thereby enter the plane diffraction grating as fourth incident light and such that fourth diffracted light is converged at the focal point by the concave mirror, to thereby enable extraction of light having a specific wavelength; and an exit slit which is disposed in the vicinity of a focal point at which eighth diffracted light is to be converged by the concave mirror so as to be able to extract light of specific wavelength, wherein the light reflected by the third reflection means re-enters the concave mirror; the light exiting the concave mirror enters the plane diffraction grating as fifth incident light; fifth diffracted light is reflected by the first reflection means, to thereby enter the plane diffraction grating as sixth incident light; sixth diffracted light is reflected by the second reflection means, to thereby enter the plane diffraction grating as seventh incident light; and seventh diffracted light is reflected by the first reflection means, to thereby enter the plane diffraction grating as eighth incident light.

By means of the foregoing arrangement, light of specific wavelength component is selected by an intermediate slit provided in the vicinity of a focal point at which the fourth diffracted light is converged by the concave mirror. The light is further subjected to repeated diffraction in a return path. As a result, the wavelength range of a specific wavelength component selected by an exit slit provided in the vicinity of a focal point at which the eighth diffracted light is converged by the concave mirror becomes narrower.

A monochromator of another aspect of the invention is characterized in that the first reflection means is constituted of two plane mirrors.

By means of such a simple arrangement, a high-resolution monochromator can be obtained.

A monochromator of another aspect of the invention is characterized in that the second reflection means is constituted of a plane mirror having a reflection surface substantially orthogonal to an optical path of second diffracted light that has been subjected to diffraction of the diffraction grating.

As a result, second reflection means can be constituted of a single plane mirror, whereby a high-resolution monochromator can be obtained by a simpler construction.

A monochromator of another aspect of the invention is characterized in the fifth through eight diffraction operations are arranged so as to realize a subtractive dispersion arrangement for canceling dispersion attributable to the first through fourth diffraction operations.

As a result, there can be realized a state of subtractive dispersion in which dispersion is reduced within the wavelength width of the light having entered the plane diffraction grating. In the state of subtractive dispersion, even when the wavelength of LUM has been changed, a structure can be made simple without a necessity for changing the width of an exit slit.

A monochromator of another aspect of the invention is characterized in that the third reflection means is constituted of an intermediate slit, and two plane mirrors arranged in a direction in line with gratings of the plane diffraction grating, such that the intermediate slit is sandwiched between the gratings.

As a result, a subtractive dispersion arrangement for canceling a dispersed state can be realized by use of a smaller number of optical components.

A monochromator of another aspect of the invention is characterized in that the fifth through eight diffraction operations are arranged so as to realize an additive dispersion arrangement for further increasing the amount of dispersion attributable to the first through fourth diffraction operations.

As a result, there can be realized a state of additive dispersion in which dispersion of the light having entered a plane diffraction grating is increased further. The wavelength range of a specific wavelength component to be selected by an exit slit becomes further narrow.

A monochromator of another aspect of the invention is characterized in that the third reflection means is constituted of an intermediate slit, and two plane mirrors arranged in a direction substantially perpendicular to a direction in line with gratings of the plane diffraction grating, such that the intermediate slit is sandwiched between the gratings.

As a result, an additive dispersion arrangement which further increases the amount of dispersion can be realized by use of a smaller number of optical components.

A monochromator of another aspect of the invention is characterized in that the third reflection means is constituted such that an angle of fourth light diffracted by the plane diffraction grating with respect to a grating surface of the plane diffraction grating becomes coincident with an angle of fifth incident light having entered the plane diffraction grating with respect to a grating surface of the diffraction grating.

As a result, the range of a specific wavelength to be selected by the intermediate slit can be caused to coincide with the range of a specific wavelength to be selected by the exit slit, without use of a mechanism for moving the slit over a wide range of wavelength.

A monochromator of the invention is characterized in that the third reflection means is constituted of an intermediate slit, a lens, and a plane mirror.

As a result, the range of a specific wavelength to be selected by the intermediate slit can be caused to coincide with the range of a specific wavelength to be selected by the exit slit, without use of a mechanism for moving the slit over a wide range of wavelength.

An optical spectrum analyzer according to the invention includes a rotation mechanism for rotating the plane diffraction grating while an axis parallel to gratings is taken as a rotation axis; a light receiver for receiving light exiting from the exit slit; display means; and control means for displaying on the display means a spectrum of light exiting from the exit slit.

An optical spectrum analyzer which measures the wavelength and intensity of incident light and displays the spectrum on the surface of display means can achieve a high-resolution, wide close-in dynamic range and which enables downsizing of housing for an optical spectrum analyzer.

DETAILED DESCRIPTION OF THE PREFERRED EMBODIMENTS

Embodiments of the invention will be described hereinbelow with reference to the drawings.

First Embodiment

To begin with, a first embodiment of the invention will be described.

Figure 1:
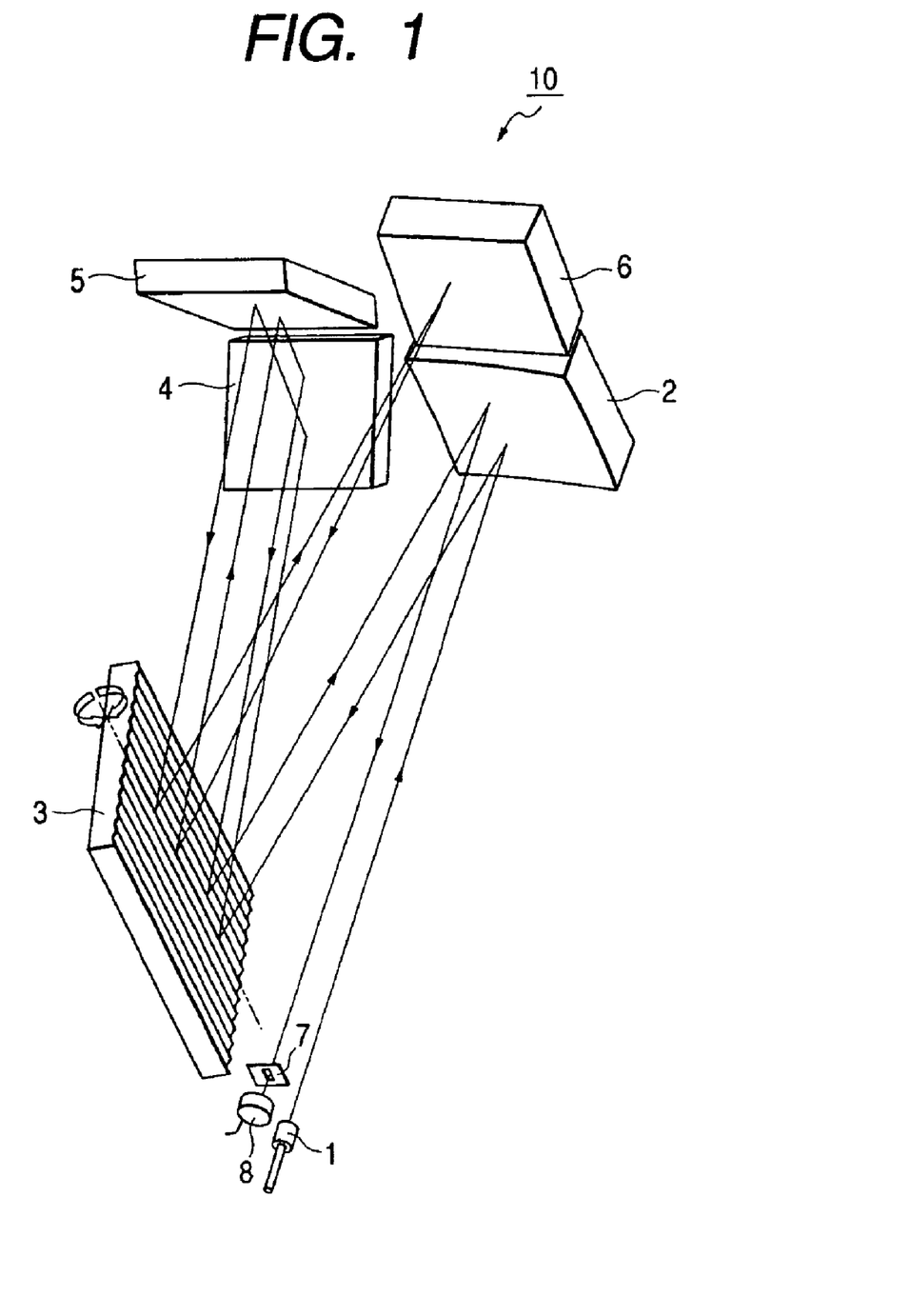
FIG. 1 is a view showing a monochromator according to a first embodiment of the invention.

As shown in FIG. 1, a monochromator 10 of the first embodiment comprises a concave mirror 2 which converts incident light having entered from an optical fiber 1 into parallel light and outputs the parallel light; a plane diffraction grating 3 for diffracting the parallel light; first reflection means which is constituted of plane mirrors 4, 5 and reflects the light diffracted by the plane diffraction grating 3 such that the light becomes displaced to a direction parallel to the grating of the plane diffraction grating 3; a plane mirror 6 which has a reflection mirror substantially orthogonal to an optical path of the light diffracted by the plane diffraction grating 3 and which reflects the diffracted light so as to enter the plane diffraction grating 3; and an output slit 7 for extracting only light of specific wavelength at a point located in the vicinity of a focal point into which the light having been subjected to fourth diffraction performed by the plane diffraction grating 3 is converged by the concave mirror 2.

The function and operation of the monochromator 10 of the embodiment will now be described.

The incident light (LUM) having entered from the optical fiber 1 is converted into parallel light by the concave mirror 2, and the parallel light is subjected to first diffraction performed by the plane diffraction grating 3. The light having been subjected to first diffraction is reflected by the plane mirrors 4, 5 (first reflection means) and displaced to a direction parallel to gratings of the plane diffraction grating 3. The thus-displaced light again enters the plane diffraction grating 3. The incident light is subjected to second diffraction.

The light having been subjected to second diffraction is reflected by a plane mirror 6 (second reflection means) arranged substantially orthogonal to the optical path of the diffracted light and enters the plane diffraction grating 3, where the light is subjected to third diffraction.

The light having subjected to third diffraction is again displaced to a point close to the position where the light having been subjected to first diffraction enters, by means of the plane mirrors 4, 5. The diffracted light enters the plane diffraction grating 3 as fourth incident light, as a result of which the light is subjected to fourth diffraction.

The light having been subjected to fourth diffraction is converged by the concave mirror 2. From the thus-converged light, light of specific wavelength is selected by the output slit 7 placed in the vicinity of the focal point, and the thus-selected light is output to a light receiver 8.

As in the case of the monochromator 10 of the embodiment, an optical arrangement in which light is subjected to four diffraction operations is called an additive dispersion arrangement. Light rays are dispersed in the same direction, so long as the rays have the same wavelength. The greater the number of times light is subjected to diffraction, the greater the increase in the amount of dispersion for a certain wavelength.

Hence, the wavelength range of a specific wavelength component selected by the output slit 7 becomes narrow, thereby providing a high-resolution monochromator.

Second Embodiment

A second embodiment of the invention will now be described. In the second embodiment to be described hereinbelow, those members which are the same as those described in connection with FIG. 1 are assigned the same or corresponding reference numerals, and their repeated explanations are simplified or omitted.

Figure 2:
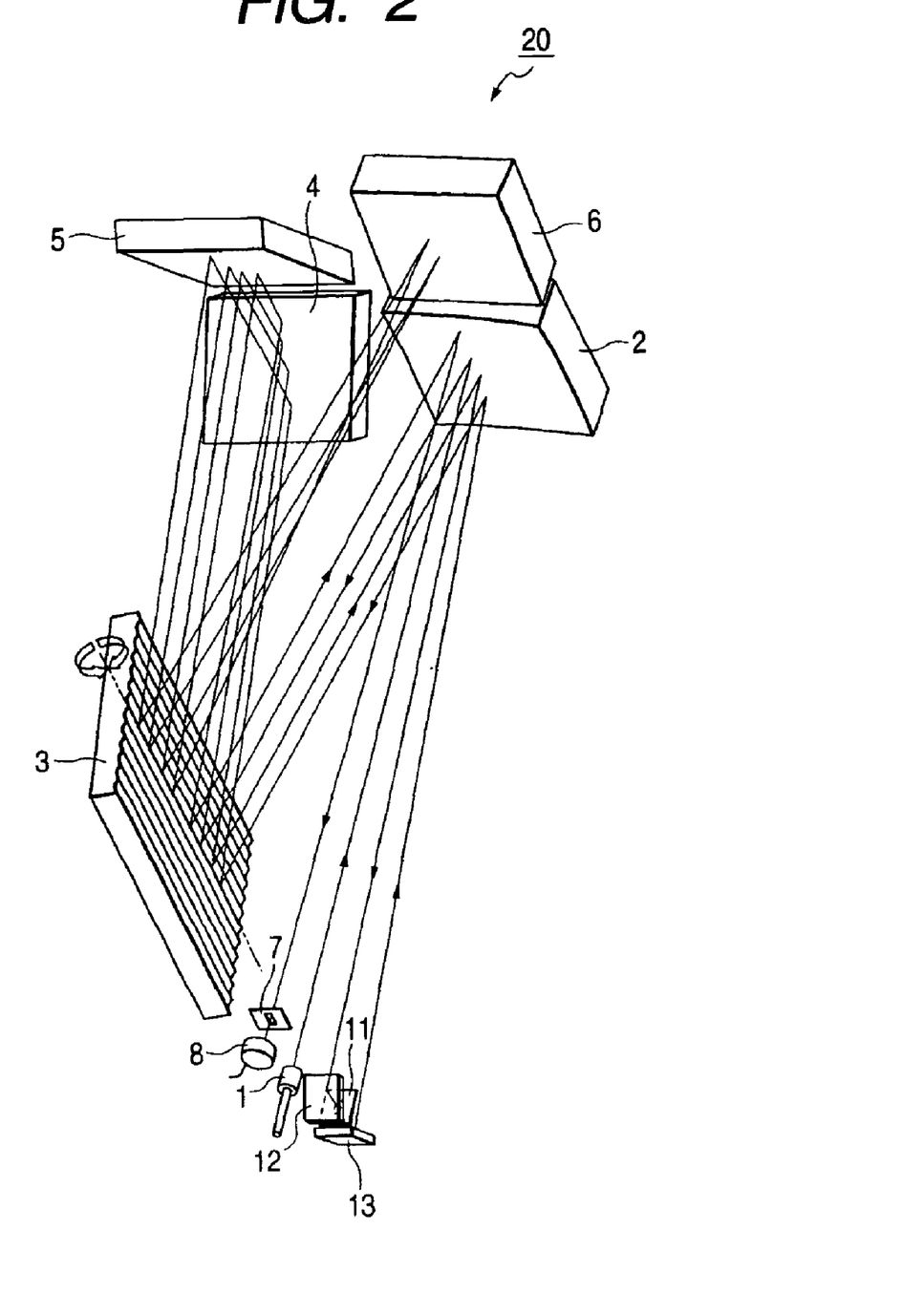
FIG. 2 is a view showing a monochromator according to a second embodiment of the invention.

As shown in FIG. 2, a monochromator 20 of the second embodiment is based on the configuration of the monochromator 10 of the first embodiment (see FIG. 1) and further comprises third reflection means 9 (constituted of plane mirrors 12, 13 and the intermediate slit 11) which is placed in the vicinity of a focal point—into which the fourth diffracted light is converged by the concave mirror 2—and which causes the light to re-enter the concave mirror 2.

The light reflected from the third reflection means 9 again enters the concave mirror 2, and the outgoing light from the concave mirror 2 enters the plane diffraction grating as fifth incident light.

Fifth diffracted light enters the plane diffraction grating 3 by way of the plane mirrors 4, 5 (first reflection means). Next, sixth diffracted light is reflected by the plane mirror 6 (second reflection means), thereby entering the plane diffraction grating 3 as seventh incident light.

The seventh diffracted light is reflected by the plane mirrors 4, 5 (first reflection means), thereby entering the plane diffraction grating 3 as eighth incident light.

From eighth diffracted light, light of only a specific wavelength is selected by the exit slit 7 which is provided in the vicinity of a focal point of the light converged by the concave mirror 2 so as to enable extraction of light of specific wavelength. The thus selected light exits to the light receiver 8.

As mentioned above, in the embodiment, the third reflection means 9 is disposed in the vicinity of the focal point at which the fourth diffracted light is converged by the concave mirror 2. The fourth diffracted light converged by the concave mirror 2 is caused to enter the third reflection means 9, whereby the light is subjected to four additional diffraction operations as compared with the first embodiment. Eighth diffracted light is converted by the concave mirror 2.

In the embodiment, the third reflection means 9 is constituted of two plane mirrors 12, 13 such that the intermediate slit 11 is sandwiched between the two mirrors in the direction of gratings of the plane diffraction grating 3.

By means of the arrangement of the intermediate slit 11 and the plane mirrors 12, 13, four diffraction operations arising in a return path (i.e., fifth through eight diffraction operations) act as an arrangement called a "subtractive dispersion arrangement" for canceling dispersion attributable to wavelengths developing in an approaching path (first through fourth diffraction operations).

In the embodiment, the light of specific wavelength which has been selected by the intermediate slit 1 disposed in the vicinity of the focal position of the concave mirror 2 in the approaching path is also subjected to repeated diffraction in the return path. Components other than the specific wavelength component included in the light selected by the intermediate slit 11; that is, stray light, can be eliminated by the exit slit 7 disposed in the vicinity of the focal point of the concave mirror 2, whereby high-resolution, wide close-in dynamic range can be obtained.

Third Embodiment

A third embodiment of the invention will now be described. In the third embodiment which will be described below, those members which are the same as those which have already been described by reference to FIG. 1 or 2 are assigned the same or corresponding reference numerals, and their repeated explanations are simplified or omitted.

Figure 3:
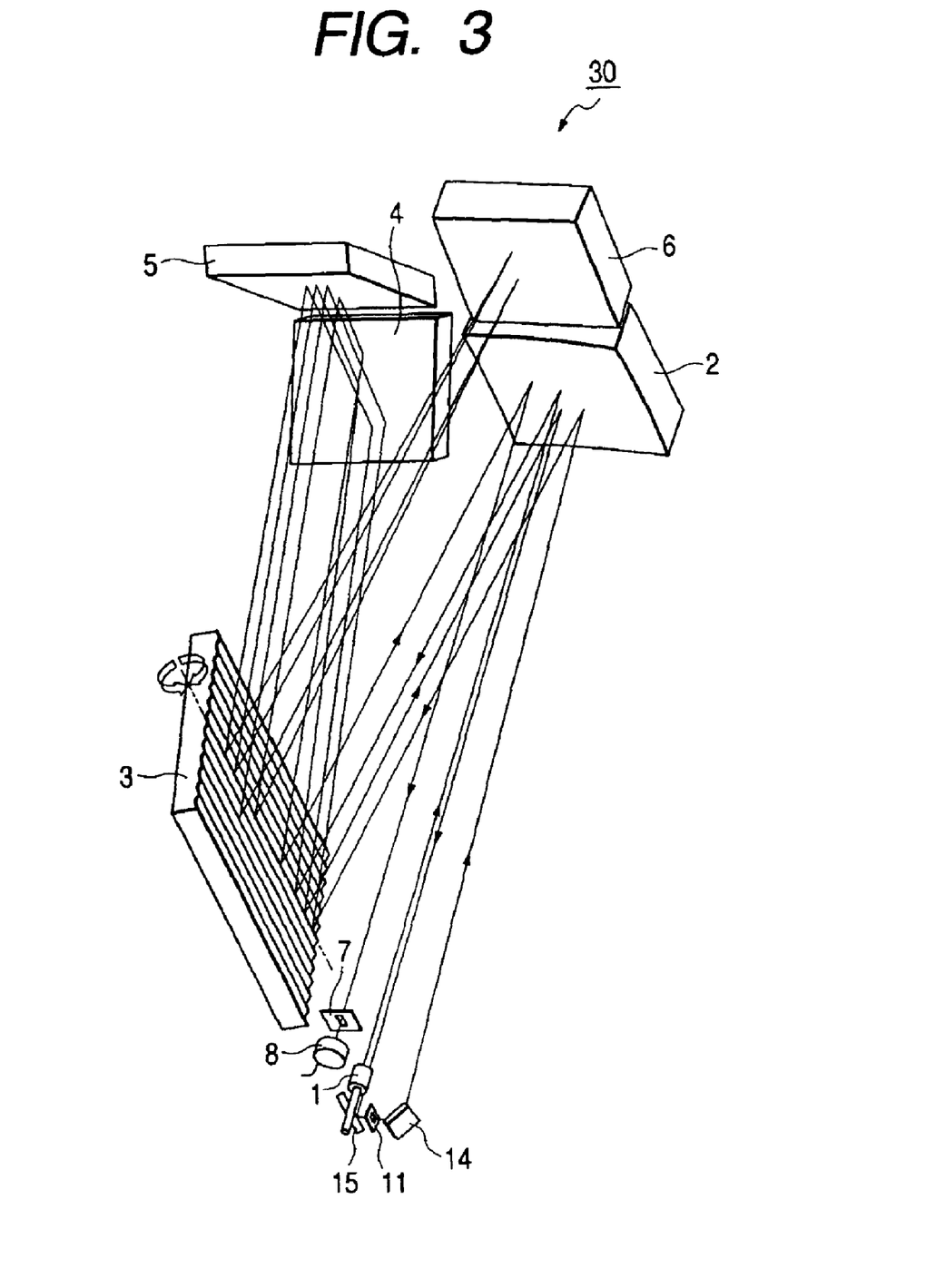
FIG. 3 is a view showing a monochromator according to a third embodiment of the invention.

As shown in FIG. 3, a monochromator 30 of the third embodiment is provided with plane mirrors 14, 15 which are placed in a direction substantially perpendicular to the direction of gratings of the plane diffraction grating 3 such that the intermediate slit 11 is sandwiched between the two plane mirrors 14, 15.

By means of the arrangement of the intermediate slit 11 and the plane mirrors 14, 15, four diffraction operations arising in the return path constitute a so-called additive dispersion arrangement which further increases the amount of dispersion caused by wavelengths arising in the return path.

The light having a specific wavelength component selected by the intermediate slit placed in the vicinity of the focal point of the concave mirror 2 in the approaching path is subjected to repeated diffraction operations even in the return path. The wavelength range of the specific wavelength components selected by the exit slit 7 becomes narrower.

As a result, higher resolution is achieved. By means of two-time selection of a wavelength range, there can be obtained a monochromator having wide close-in dynamic range.

In the embodiment, the third reflection means 9 is constituted of the two plane mirrors 14, 15 disposed in a direction substantially perpendicular to the direction of gratings of the plane diffraction grating 3 such that the intermediate slit 1 is sandwiched between the plane mirrors 14, 15. Therefore, a high-resolution, wide close-in dynamic range is achieved with a smaller number of components.

However, provided that an attempt has been made to achieve a match between the range of the specific wavelength selected by the intermediate slit 11 and the range of the specific wavelength selected by the exit slit 7, either or both of the intermediate slit 11 and the exit slit 7 must be moved. For this reason, a mechanism (not shown) for moving the slit is required.

Fourth Embodiment

A fourth embodiment of the invention will now be described. In the fourth embodiment which will be described below, those members which are the same as those which have already been described by reference to FIGS. 1 through 3 are assigned the same or corresponding reference numerals, and their repeated explanations are simplified or omitted.

Figure 4:
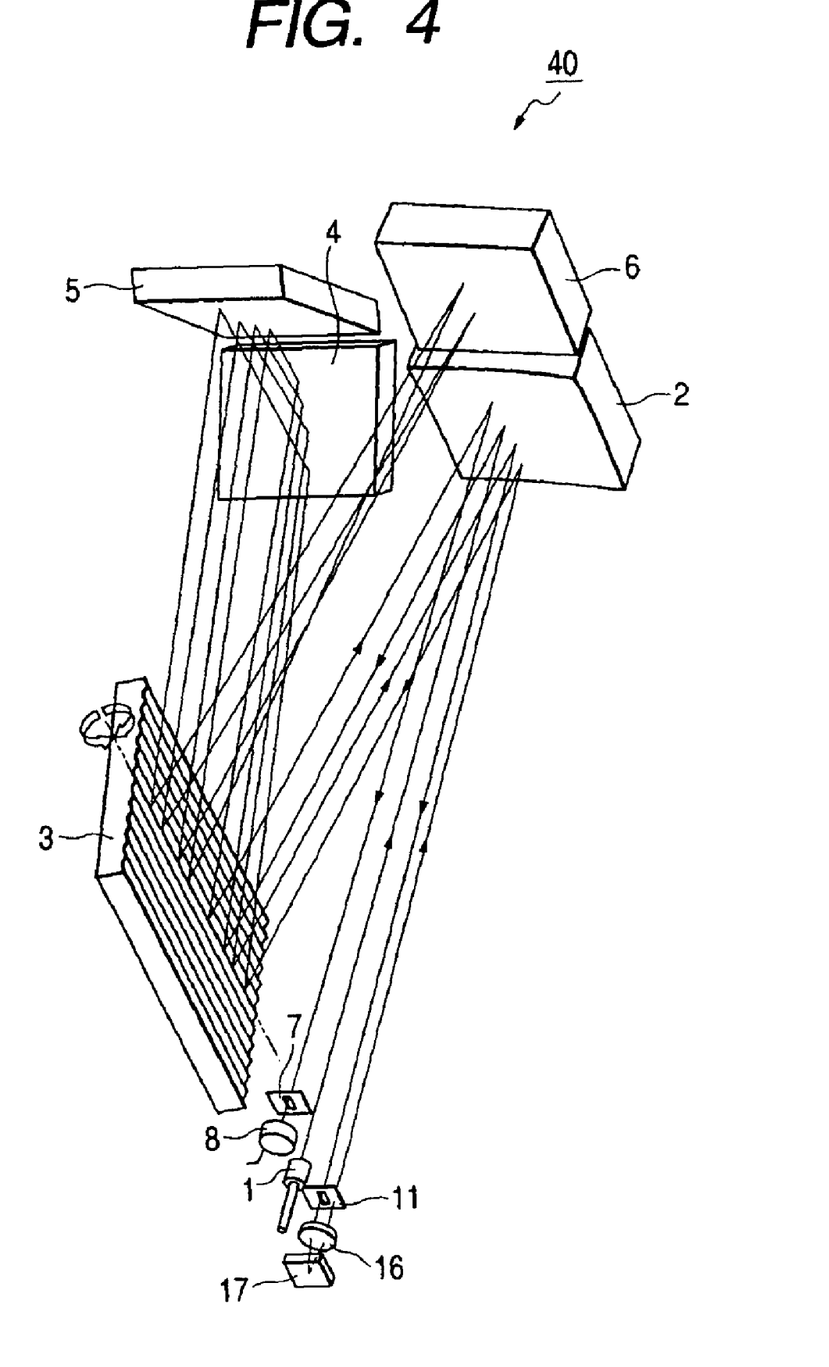
FIG. 4 is a view showing a monochromator according to a fourth embodiment of the invention.

As shown in FIG. 4, in a monochromator 40 of the fourth embodiment, the third reflection means 9 is constituted of a lens 16 and a plane mirror 17 such that a match arises between an angle of the fourth light diffracted by the plane diffraction grating 3 with respect to a grating plane and an angle of the plane diffraction grating 3 with respect to the grating plane formed when light is caused to enter the concave mirror 2 by the third reflection means 9, converted into parallel light, and enters the plane diffraction grating 3 as fifth incident light.

As a result, a range of specific wavelength selected by the intermediate slit 11 and a range of specific wavelength selected by the exit slit 7 can be caused to coincide with each other without use of a mechanism for moving the slit within a wide range of wavelength.

The monochromators of the second through fourth embodiments are provided with the third reflection means 9, whereby there can be achieved a monochromator having a smaller number of optical components and a high-resolution, wide close-in dynamic range within a wide range of wavelength.

Figure 5:
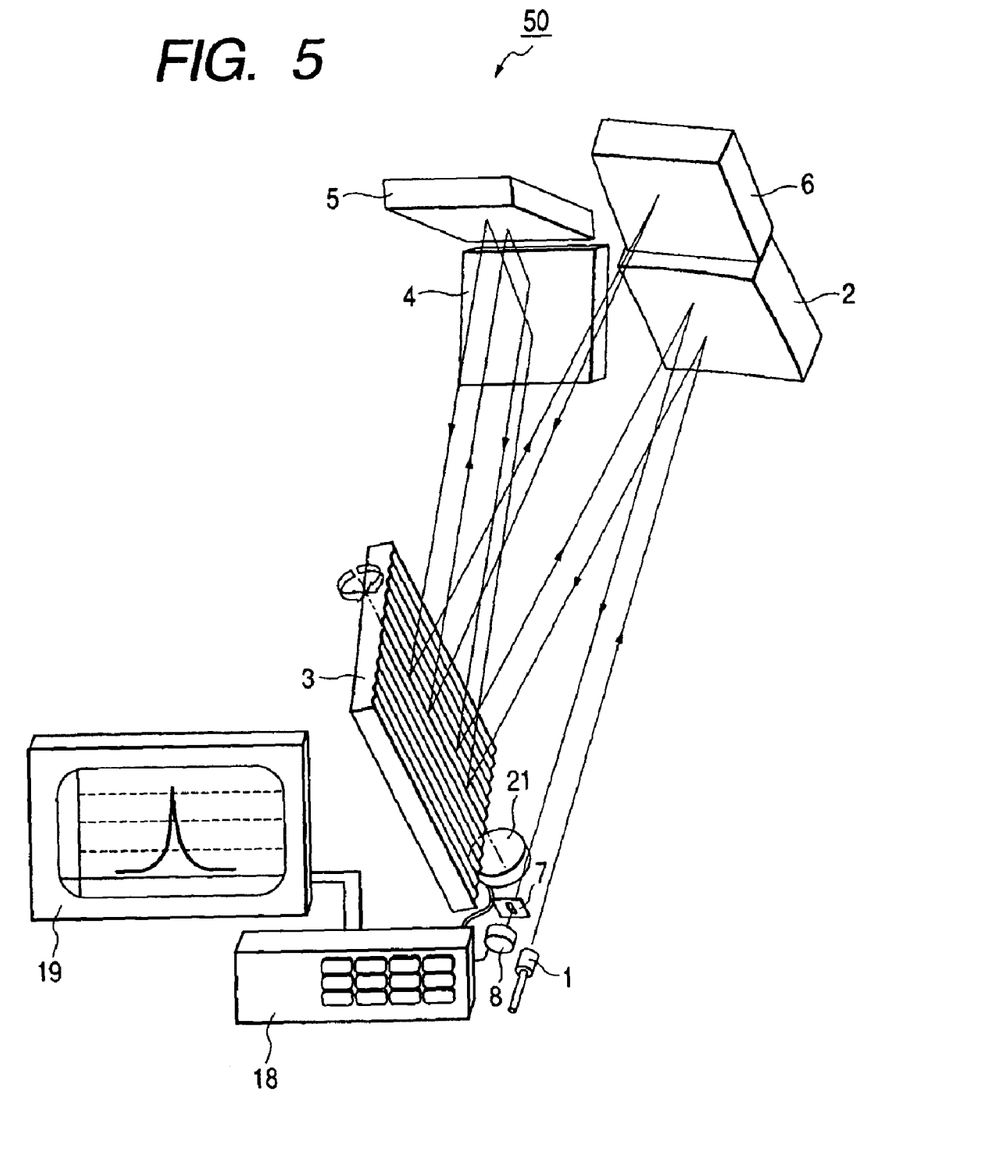
FIG. 5 is a view showing an example configuration of an optical spectrum analyzer according to the invention.

Any one of the monochromators 10, 20, 30, 40 of the first through fourth embodiments is equipped with a rotation mechanism 21 for rotating the plane diffraction grating 3 as a rotation axis parallel with gratings of the plane diffraction grating 3; the light receiver 8 for receiving light exiting from the exit slit 7; display means 19 capable of displaying a spectrum; and control means 18 for controlling these elements. As a result, there is provided an optical spectrum analyzer which measures the wavelength and intensity of incident light, can display a spectrum on a screen of the display means 19, and has a high-resolution, wide close-in dynamic range characteristic.

Even when the monochromator of this embodiment is constituted through use of a lens instead of the concave mirror 2, the same effect is yielded.

Similarly, an incident slit may be used in place of the optical fiber 1.

Further, the concave mirror 2 has a parabolic mirror, thereby reducing optical aberration and enhancing the precision of the monochromator.

The monochromator of the invention may be provided with a depolarization plate interposed between the optical fiber 1 and the concave mirror 2.

Since the plane diffraction grating 3 has a characteristic of a diffraction efficiency changing in accordance with the polarized state of incident light. Hence, there can be obtained a monochromator which is not affected by the polarized state of LUM and has a high-resolution, wide close-in dynamic range characteristic, by means of interposing the depolarization plate between the optical fiber 1 and the concave mirror 2.

As has been described in detail, the invention provides a monochromator of the invention including: a concave mirror which converts incident light into parallel light and emits the parallel light; a plane diffraction grating for diffracting the parallel light emitted from the concave mirror; first reflection means which reflects first light diffracted by the plane diffraction grating and causes the diffracted light to enter the plane diffraction grating as second incident light; second reflection means which reflects second diffracted light and causes the reflected light to enter the plane diffraction grating as third incident light; and an exit slit disposed in the vicinity of a focal point such that third diffracted light is reflected by the first reflection means, to thereby enter the plane diffraction grating as fourth incident light and such that fourth diffracted light is converged at the focal point by the concave mirror, to thereby enable extraction of light having a specific wavelength. As a result, the range of specific wavelength component to be selected by the exit slit becomes narrow. Moreover, LUM passes through the concave mirror as few as two times by the exit slit for selecting a wavelength. Hence, a high-resolution, wide close-in dynamic range can be obtained within a wide temperature range.

The invention provides another monochromator including: a concave mirror which converts incident light into parallel light and emits the parallel light; a plane diffraction grating for diffracting the parallel light emitted from the concave mirror; first reflection means which reflects first light diffracted by the plane diffraction grating and causes the diffracted light to enter the plane diffraction grating as second incident light; second reflection means which reflects second diffracted light and causes the reflected light to enter the plane diffraction grating as third incident light; third reflection means disposed in the vicinity of a focal point such that third diffracted light is reflected by the first reflection means, to thereby enter the plane diffraction grating as fourth incident light and such that fourth diffracted light is converged at the focal point by the concave mirror, to thereby enable extraction of light having a specific wavelength; and an exit slit which is disposed in the vicinity of a focal point at which eighth diffracted light is to be converged by the concave mirror so as to be able to extract light of specific wavelength, wherein the light reflected by the third reflection means re-enters the concave mirror; the light exiting the concave mirror enters the plane diffraction grating as fifth incident light; fifth diffracted light is reflected by the first reflection means, to thereby enter the plane diffraction grating as sixth incident light; sixth diffracted light is reflected by the second reflection means, to thereby enter the plane diffraction grating as seventh incident light; and seventh diffracted light is reflected by the first reflection means, to thereby enter the plane diffraction grating as eighth incident light. The light is further subjected to repeated diffraction in a return path. As a result, the wavelength range of a specific wavelength component to be selected by an exit slit becomes narrower.

According to the invention, the first reflection means is constituted of two plane mirrors. Hence, there can be provided a high-resolution monochromator.

According to the invention, the second reflection means is constituted of a plane mirror having a reflection surface substantially orthogonal to an optical path of second diffracted light that has been subjected to diffraction of the diffraction grating. Hence, second reflection means can be constituted of a single plane mirror, whereby a high-resolution monochromator can be obtained by a simpler construction.

According to the invention, fifth through eight diffraction operations are arranged so as to realize a subtractive dispersion arrangement for canceling dispersion attributable to the first through fourth diffraction operations. There can be provided a monochromator which obviates a necessity for changing the width of an exit slit in the state of subtractive dispersion even when the wavelength of LUM has been changed and whose structure can be made simple.

The invention provides a monochromator, wherein the third reflection means can be constituted of an intermediate slit, and two plane mirrors arranged in a direction in line with gratings of the plane diffraction grating, such that the intermediate slit is sandwiched between the gratings. As a result, a subtractive dispersion arrangement for canceling a dispersed state can be realized by use of a smaller number of optical components.

The invention provides a monochromator, wherein the fifth through eight diffraction operations are arranged so as to realize an additive dispersion arrangement for further increasing the amount of dispersion attributable to the first through fourth diffraction operations, whereby there can be realized a state of additive dispersion in which dispersion of the light having entered a plane diffraction grating is increased further and the wavelength range of a specific wavelength component to be selected by an exit slit becomes further narrow.

The invention provides a monochromator, wherein the third reflection means is constituted of an intermediate slit, and two plane mirrors arranged in a direction substantially perpendicular to a direction in line with gratings of the plane diffraction grating, such that the intermediate slit is sandwiched between the gratings, thereby realizing an additive dispersion arrangement which further increases the amount of dispersion by use of a smaller number of optical components.

The invention provides a monochromator, wherein the third reflection means is constituted such that an angle of fourth light diffracted by the plane diffraction grating with respect to a grating surface of the plane diffraction grating becomes coincident with an angle of fifth incident light having entered the plane diffraction grating with respect to a grating surface of the diffraction grating, whereby the range of a specific wavelength to be selected by the intermediate slit can be caused to coincide with the range of a specific wavelength to be selected by the exit slit, without use of a mechanism for moving the slit over a wide range of wavelength.

The invention provides a monochromator, wherein the third reflection means is constituted of an intermediate slit, a lens, and a plane mirror and wherein the range of a specific wavelength to be selected by the intermediate slit can be caused to coincide with the range of a specific wavelength to be selected by the exit slit, without use of a mechanism for moving the slit over a wide range of wavelength.

The invention provides an optical spectrum analyzer including: a rotation mechanism for rotating the plane diffraction grating while an axis parallel to gratings is taken as a rotation axis; a light receiver for receiving light exiting from the exit slit; display means; and control means, whereby a spectrum of light exiting from the exit slit is displayed on the display means. Thus, there can be provided an optical spectrum analyzer which measures the wavelength and intensity of incident light and displays the spectrum on the surface of display means can achieve a high-resolution, wide close-in dynamic range and which enables downsizing of housing for an optical spectrum analyzer.

What is claimed is:

1. A monochromator comprising:

a concave mirror which converts incident light into parallel light and emits the parallel light;

a plane diffraction grating for diffracting the parallel light emitted from the concave mirror;

first reflection means which reflects first light diffracted by the plane diffraction grating and causes the diffracted light to enter the plane diffraction grating as second incident light;

second reflection means which reflects second diffracted light and causes the reflected light to enter the plane diffraction grating as third incident light; and an exit slit disposed in the vicinity of a focal point such that third diffracted light is reflected by the first reflection means, to thereby enter the plane diffraction grating as fourth incident light and such that fourth diffracted light is converged at the focal point by the concave mirror, to thereby enable extraction of light having a specific wavelength, wherein the concave mirror is located on the same side of the exit slit as the second reflection means.

2. A monochromator comprising:

a concave mirror which converts incident light into parallel light and emits the parallel light;

a plane diffraction grating for diffracting the parallel light emitted from the concave mirror;

first reflection means which reflects first light diffracted by the plane diffraction grating and causes the diffracted light to enter the plane diffraction grating as second incident light, wherein the first reflection means is constituted of two plane mirrors;

second reflection means which reflects second diffracted light and causes the reflected light to enter the plane diffraction grating as third incident light: and an exit slit disposed in the vicinity of a focal point such that third diffracted light is reflected by the first reflection means, to thereby enter the plane diffraction grating as fourth incident light and such that fourth diffracted light is converged at the focal point by the concave mirror, to thereby enable extraction of light having a specific wavelength.

3. The monochromator according to claim 1 wherein the second reflection means is constituted of a plane mirror having a reflection surface substantially orthogonal to an optical path of second diffracted light that has been subjected to diffraction of the diffraction grating.

4. A monochromator comprising:

a concave mirror which converts incident light into parallel light and emits the parallel light;

a plane diffraction grating for diffracting the parallel light emitted from the concave mirror;

first reflection means which reflects first light diffracted by the plane diffraction grating and causes the diffracted light to enter the plane diffraction grating as second incident light;

second reflection means which reflects second diffracted light and causes the reflected light to enter the plane diffraction grating as third incident light;

third reflection means disposed in the vicinity of a focal point such that third diffracted light is reflected by the first reflection means, to thereby enter the plane diffraction grating as fourth incident light and such that fourth diffracted light is converged at the focal point by the concave mirror, to thereby enable extraction of light having a specific wavelength; and an exit slit which is disposed in the vicinity of a focal point at which eighth diffracted light is to be converged by the concave mirror so as to be able to extract light of specific wavelength;

wherein the light reflected by the third reflection means re-enters the concave mirror;

the light exiting the concave mirror enters the plane diffraction grating as fifth incident light;

fifth diffracted light is reflected by the first reflection means, to thereby enter the plane diffraction grating as sixth incident light;

sixth diffracted light is reflected by the second reflection means, to thereby enter the plane diffraction grating as seventh incident light; and seventh diffracted light is reflected by the first reflection means, to thereby enter the plane diffraction grating as eighth incident light.

5. The monochromator according to claim 4 wherein the first reflection means is constituted of two plane mirrors.

6. The monochromator according to claim 4 wherein the second reflection means is constituted of a plane mirror having a reflection surface substantially orthogonal to an optical path of second diffracted light that has been subjected to diffraction of the diffraction grating.

7. The monochromator according to claim 4, wherein the fifth through eight diffraction operations are arranged so as to realize a subtractive dispersion arrangement for canceling dispersion attributable to the first through fourth diffraction operations.

8. The monochromator according to claim 4, wherein the third reflection means is constituted of an intermediate slit, and two plane mirrors arranged in a direction in line with gratings of the plane diffraction grating, such that the intermediate slit is sandwiched between the gratings.

9. The monochromator according to claim 4, wherein the fifth through eight diffraction operations are arranged so as to realize an additive dispersion arrangement for further increasing the amount of dispersion attributable to the first through fourth diffraction operations.

10. The monochromator according to claim 9, wherein the third reflection means is constituted of an intermediate slit, and two plane mirrors arranged in a direction substantially perpendicular to a direction in line with gratings of the plane diffraction grating, such that the intermediate slit is sandwiched between the gratings.

11. The monochromator according to claim 4, wherein the third reflection means is constituted such that an angle of fourth light diffracted by the plane diffraction grating with respect to a grating surface of the plane diffraction grating becomes coincident with an angle of fifth incident light having entered the plane diffraction grating with respect to a grating surface of the diffraction grating.

12. The monochromator according to claim 11, wherein the third reflection means is constituted of an intermediate slit, a lens, and a plane mirror.

13. An optical spectrum analyzer, comprising:

a concave mirror which converts incident light into parallel light and emits the parallel light;

a plane diffraction grating for diffracting the parallel light emitted from the concave mirror;

first reflection means which reflects first light diffracted by the plane diffraction grating and causes the diffracted light to enter the plane diffraction grating as second incident light;

second reflection means which reflects second diffracted light and causes the reflected light to enter the plane diffraction grating as third incident light;

an exit slit disposed in the vicinity of a focal point such that third diffracted light is reflected by the first reflection means, to thereby enter the plane diffraction grating as fourth incident light and such that fourth diffracted light is converged at the focal point by the concave mirror, to thereby enable extraction of light having a specific wavelength, wherein the concave mirror is located on the same side of the exit slit as the second reflection means;

a rotation mechanism for rotating the plane diffraction grating while an axis parallel to gratings is taken as a rotation axis;

a light receiver for receiving light exiting from the exit slit;

display means; and control means for displaying on the display means a spectrum of light exiting from the exit slit.

14. An optical spectrum analyzer, comprising:

a concave mirror which converts incident light into parallel light and emits the parallel light;

a plane diffraction grating for diffracting the parallel light emitted from the concave mirror;

first reflection means which reflects first light diffracted by the plane diffraction grating and causes the diffracted light to enter the plane diffraction grating as second incident light;

second reflection means which reflects second diffracted light and causes the reflected light to enter the plane diffraction grating as third incident light;

third reflection means disposed in the vicinity of a focal point such that third diffracted light is reflected by the first reflection means, to thereby enter the plane diffraction grating as fourth incident light and such that fourth diffracted light is converged at the focal point by the concave mirror, to thereby enable extraction of light having a specific wavelength;

an exit slit which is disposed in the vicinity of a focal point at which eighth diffracted light is to be converged by the concave mirror so as to be able to extract light of specific wavelength;

a rotation mechanism for rotating the plane diffraction grating while an axis parallel to gratings is taken as a rotation axis;

a light receiver for receiving light exiting from the exit slit;

display means; and control means for displaying on the display means a spectrum of light exiting from the exit slit; wherein the light reflected by the third reflection means re-enters the concave mirror;

the light exiting the concave mirror enters the plane diffraction grating as fifth incident light;

fifth diffracted light is reflected by the first reflection means, to thereby enter the plane diffraction grating as sixth incident light;

sixth diffracted light is reflected by the second reflection means, to thereby enter the plane diffraction grating as seventh incident light; and seventh diffracted light is reflected by the first reflection means, to thereby enter the plane diffraction grating as eighth incident light.

\* \* \* \* \*